Jan. 1, 1963                    E. BLAHA                    3,071,357
                     APPARATUS FOR FORMING CLAY SPHERES
Filed April 7, 1960                                     3 Sheets-Sheet 1
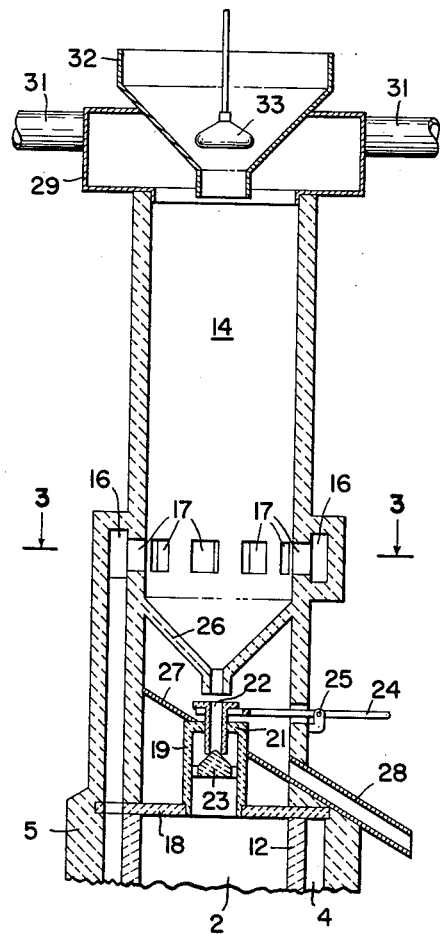
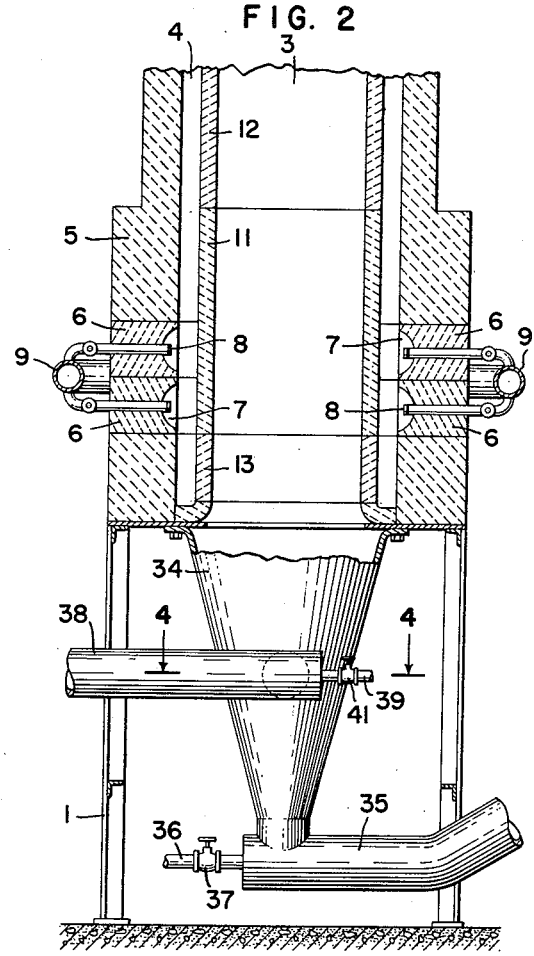
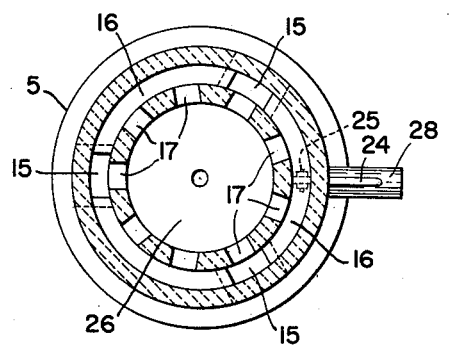
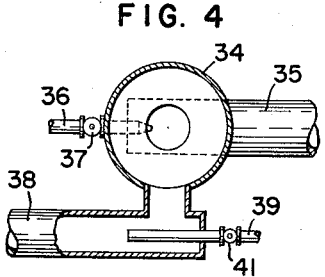
INVENTOR.
EMIL BLAHA
BY
ATTORNEY.

Jan. 1, 1963  E. BLAHA  3,071,357
APPARATUS FOR FORMING CLAY SPHERES
Filed April 7, 1960  3 Sheets-Sheet 2
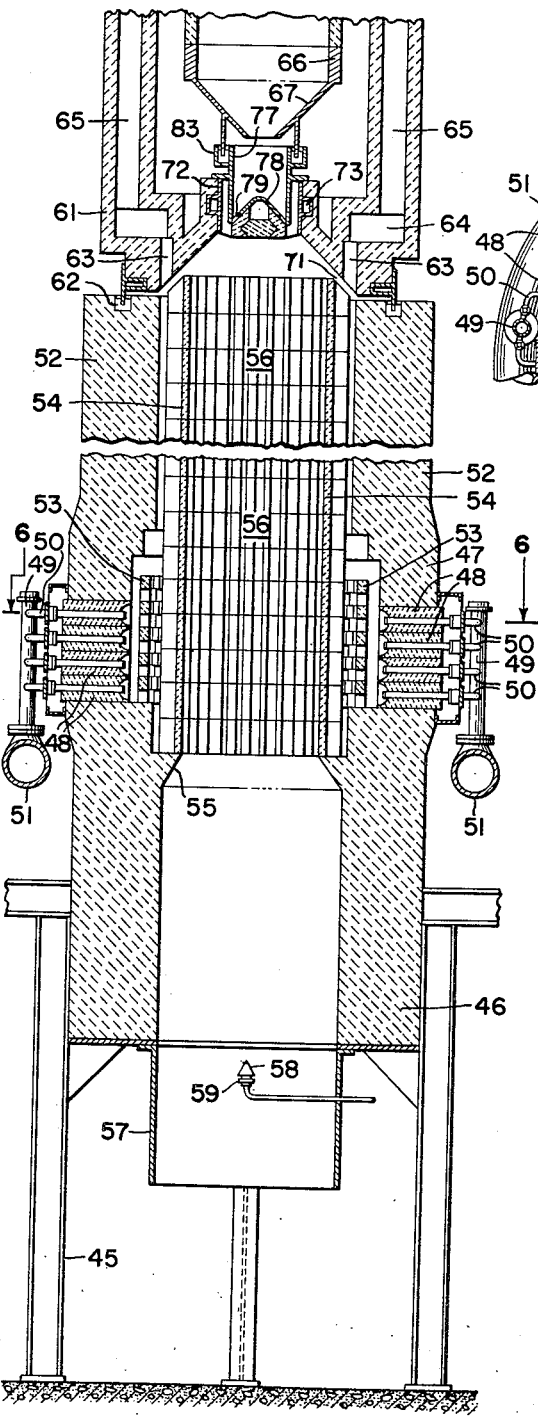
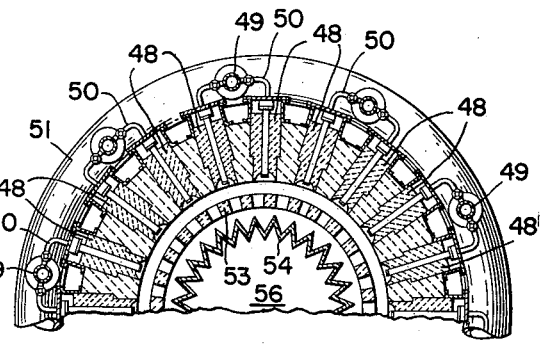
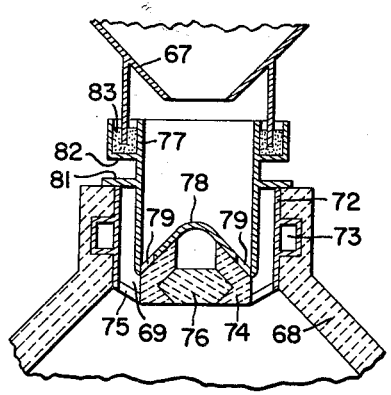
*INVENTOR.*
EMIL BLAHA
BY
ATTORNEY.

Jan. 1, 1963 E. BLAHA 3,071,357
APPARATUS FOR FORMING CLAY SPHERES
Filed April 7, 1960 3 Sheets-Sheet 3
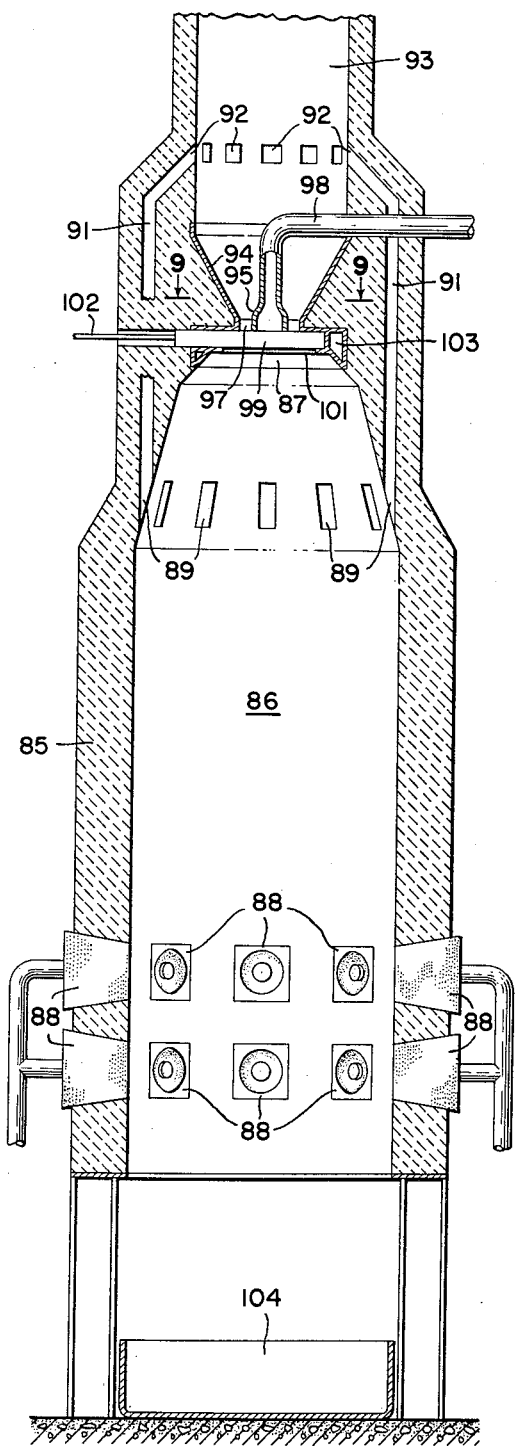
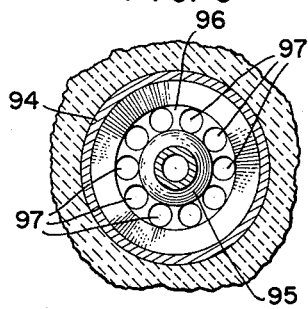
INVENTOR.
EMIL BLAHA
ATTORNEY.

United States Patent Office 3,071,357
Patented Jan. 1, 1963

3,071,357
APPARATUS FOR FORMING CLAY SPHERES
Emil Blaha, Cheltenham, Pa., assignor to Selas Corporation of America, Dresher, Pa., a corporation of Pennsylvania
Filed Apr. 7, 1960, Ser. No. 20,692
4 Claims. (Cl. 263—30)

The present invention relates to the expansion of clay particles, and more particularly to a furnace in which the clay in granular or pellet form is heated to fusion temperature. At this temperature, each of the clay particles bloats or expands to form a hollow sphere.

In the prior art, hollow clay spheres have been formed by discharging clay particles in a stream in an elongated flame. As the particles travel with the flame, they are heated to fusion temperature and expand. This operation causes the stream of particles to spread, and due to their tacky condition, many of them adhere to the walls of the chamber in which they are being made. In a relatively short time, the accumulation on the walls of the chamber becomes so great that the equipment has to be shut down for cleaning. So far as I am aware, equipment of this type has never been commercially successful because of the short operating periods and the low yield of an acceptable product.

It is an object of this invention to provide apparatus for expanding clay particles, in which the particles fall freely through a heated zone, where they are fused and expanded. It is a further object of the invention to provide a method and apparatus for making hollow clay spheres in which the tendency for the material to stick to the apparatus is greatly diminished.

Another object of the invention is to provide means to control the supply of clay particles to the fusing zone of the apparatus, and means to withdraw the fused spheres, so that there is substantially no agglomeration thereof.

The invention includes structure forming a vertically extending furnace chamber having a preheating chamber located thereabove.

Means is provided to supply particles, first to the preheating chamber, and then through a flow controlling device to the furnace chamber. The particles fall freely through this latter chamber, and are heated to the fusion temperature while they are falling. At the lower end of the chamber, they are chilled and discharged to a point of collection.

The present application is a continuation-in-part of my application Serial No. 652,027, filed April 10, 1959, entitled, Fusing of Clay Particles, now abandoned.

The various features of novelty, which characterize my invention, are pointed out with particularity in the claims annexed to and forming a part of this specification. For a better understanding of the invention, however, its advantages and specific objects attained with its use, reference should be had to the accompanying drawings and descriptive matter in which I have illustrated and described a preferred embodiment of the invention.

In the drawings:

FIG. 1 is a section view of the upper part of the apparatus, showing the preheating chamber and the particle flow controlling device;

FIG. 2 is a section view of the lower portion of the apparatus, showing the furnace chamber and the fused particle collecting means;

FIG. 3 is a view taken on line 3—3 of FIG. 1;

FIG. 4 is a view taken on line 4—4 of FIG. 2;

FIG. 5 is a sectional view of a modified form of furnace chamber;

FIG. 6 is a section taken on line 6—6 of FIG. 5;

FIG. 7 is an enlarged sectional view of the particle feeding means of FIG. 5;

FIG. 8 is a view, in section, of another form the furnace may take, and

FIG. 9 is a view on line 9—9 of FIG. 8.

Referring to the drawings, there is shown in FIG. 2 the lower portion of the furnace structure, which is mounted on a framework 1 of structural steel. The furnace includes a furnace chamber 2, that is formed by an inner cylindrical muffle or wall 3. An outer furnace wall 5 surrounds wall 3, and is separated therefrom by an annular combustion space 4, that extends to the top of wall 3. A number of burners 6 are built into the lower portion of the furnace wall 5, and are spaced around the same in order to heat the muffle 3 and the combustion chamber evenly. These burners may be of any suitable type, but preferably, and as shown herein, are of the type disclosed in Patent 2,215,079. Burners of this type include a cup-shaped depression 7 formed in the face of the burner that is, in fact, a portion of the furnace wall. Fuel in the form of a combustible mixture is supplied by means of a distributor 8 to the cup, and is burned along the surface thereof to heat it to incandescence. This, along with the products of combustion, heats muffle wall 3, and therefore chamber 2. All of the distributors of the various burners are supplied from a common manifold 9. Wall 3 is made of a plurality of rings of refractory material, whose composition varies at different elevations. The portion 11 of the wall immediately in front of the burners and a short distance thereabove is made of some highly refractory material, such as aluminum oxide. As the products of combustion from the burners rise, they will cool somewhat, so that it is important to have the upper portion 12 of the wall made of a material having a high heat conductivity, such as silicon carbide. The lower portion of the wall is formed of a ring 13 of some porous refractory material, such as silicon carbide, so that some of the products of combustion can pass into the furnace chamber for reasons set forth below.

The hot products of combustion from the burners are collected at the upper end of the space 4, and are supplied to a preheating chamber 14, that is vertically above, and may be constructed as an extension of, the furnace chamber 2. For this reason, there are provided a plurality of ducts 15 extending from the upper end of space 4 to a channel 16 that surrounds the preheating chamber. A number of openings 17 are provided between this channel and the chamber, so that the products of combustion can flow into the chamber from all sides and heat it evenly.

Material to be treated flows between the preheating chamber 14 and the furnace chamber 2, at a rate that is controlled by a valve apparatus located in the structure between these two chambers. As disclosed herein, the top of chamber 2 consists of a plate 18, which may be of a suitable heat resistant alloy, or a refractory ceramic material. This plate is provided with a centrally located opening, above which is placed a cylindrical member 19, having its upper end turned inwardly, as indicated at 21. A collecting sleeve 22, through which the material to be treated flows, is slidably received within the flange 21, and has its lower end cooperating with the apex of a conical guide member and stopper 23, that is suitably fastened in position across the interior of member 19. Sleeve 22 can be moved vertically through a short distance by a lever 24, having a forked end that extends beneath a flange on the upper end of the sleeve. The lever is suitably pivoted at 25 on the outer surface of the apparatus. Material is directed into sleeve 22 by a cone-shaped member 26, that forms the bottom of preheating chamber 14. Material overflowing from the sleeve is collected in a space in the apparatus between the two chambers. To this end, the lower portion of this space is formed by a shield 27, that is mounted at an angle to the vertical, so that the material will flow down this shield and through a spout 28 to a collecting point.

Material is supplied to preheating chamber or zone 14, and the products of combustion are exhausted therefrom through a sheet metal hood 29, which forms the top thereof. The hood is provided with a plurality of ducts 31, through which the products of combustion are discharged, and is also provided with a supply cone 32, that is centrally located above the preheating chamber. A stopper or valve 33, cooperating with the inner surface of this cone, controls the flow of material into the preheating chamber.

The heated material is collected at the bottom of furnace chamber or fusing zone 2 by means of a collecting zone 34, which is suitably fastened to the framework 1, and which also serves to prevent loss of radiant heat from the chamber. The lower end of this cone discharges into a pipe 35 that delivers the material to some suitable collection point. As the material falls into pipe 35, it is carried to the discharge point by a blast of air under suitable pressure from a supply 36, that is controlled by a valve 37.

The pressure in the furnace chamber 2 can be controlled by exhausting the gases therein through a pipe 38, that is connected to one side of cone 34. Gas is aspirated through this pipe by means of air under pressure from a pipe 39, that is regulated by a valve 41.

In the operation of the apparatus, the burners, and the products of combustion from them in space 4, will be fired to heat wall 3 and chamber 2 to a temperature of from approximately 2950° F., immediately in front of the burners, to about 2650° F. at the top of the chamber. The spacing of the burners around the structure insures that all portions of the chamber will be heated evenly. The temperatures attained will heat the wall to incandescence, so that radiant heat will be projected therefrom inwardly against all portions of the stream of particles falling through the chamber. The products of combustion are collected at the top of space 4, and travel through ducts 15 to be discharged into the lower portion of preheating chamber 14. When these products of combustion are introduced into chamber 14, they are from 1800° F. to 2000° F. The temperature of the gases is greatly reduced by preheating particles falling through chamber 14 prior to the time the gases are discharged through ducts 31.

Clay particles in the form of cylinders or pellets are loaded into the supply cone 32, and are discharged at a regulated rate through this cone, the rate being adjusted by valve 33. These particles are preferably of a substantially uniform size and shape, so that the action of the heat will be the same on each particle, and so that they will have the same falling characteristics. The particles fall freely through chamber 14, forming a preheating zone, and are heated by the products of combustion therein. These particles are funneled by the cone 26 into sleeve 22. It is noted that more particles must be supplied to this sleeve than is possible to pass through the same. Thus, the sleeve, at all times, is kept full to overflowing, and the surplus is collected on shield 27 to be discharged through the spout 28 and re-used. Lever 24 is moved to raise sleeve 22 above the surface of cone 23, thereby permitting an annular column of the clay particles to fall through the sleeve into furnace chamber 2, forming a fusion zone. This annular column of the particles will fall straight through the chamber, and in so doing, is heated by radiation from wall 3 to above the fusion temperature of the clay, which will vary with its type, but which will be in the neighborhood of 2500° F. It has been determined that the particles of some shapes tend to spread from their columnar form as they reach the lower portion of chamber 42. For this reason, section 13 of wall 3 is made porous, so that a small quantity of products of combustion can pass radially inward through this wall to move these particles back to the center of the chamber, and keep them away from the chamber wall. The products of combustion introduced in this manner, however, are not sufficient, or moving at a high enough velocity, to create enough turbulence in chamber 2 to disturb the pattern of the falling particles.

The particles have fused by the time they reach the bottom of the burners, and have been expanded or drawn by their surface tension into hollow spherical shapes. The hollow spheres begin to cool before they reach cone 34, and are directed into discharge pipe 35, where the air supply through pipe 36 will blow these spheres to a point of collection. The air also helps to chill the spheres, so that they will not stick together as they are being removed.

One of the main reasons why prior apparatus of this type has not been practical, from a commercial point of view, is due to the fact that the particles are heated in turbulent atmosphere. When they reach fusion temperature, they are tacky on their surface, and those which are moved into engagement with the walls of the heating chamber, by the turbulence in the chamber, stick to these walls. After a relatively short period of time, the walls have become so clogged up that there is not enough area left for the particles to pass through the chamber. Furthermore, the particles that have accumulated on the surface of the heating chamber wall have an insulating value, and reduce the temperature of the chamber. It is, therefore, important that the particles be supplied to the heating chamber in such a fashion that they will fall freely in the center of the fusion zone, out of engagement with the chamber wall, but be dispersed enough so that each particle will be penetrated by heat. Such a flow is obtained with the valve device, comprising sleeve 22 and cone 23. It has been found that, if the sleeve 22 is kept full at all times, the particles will flow in an annular column around the edge of cone 23, straight down, without bouncing toward the wall of the furnace chamber. If, however, the sleeve 22 is not full, the particles will not fall in a true column, but will tend to bounce against the sides of the chamber, and if they strike it, will adhere thereto when they have been heated enough to become tacky. For this reason, it is necessary to keep the sleeve 22 full at all times. The rate of flow of the particles should be as great as possible, but should not be enough to permit sleeve 22 to become empty at any time. This rate of flow can be adjusted as required by changing the elevation of sleeve 22 relative to cone 23, and the flow can be cut off entirely by moving the sleeve against the cone. Another advantage of this type of particle flow control is that the annular stream of particles is a loose enough mass, so that the radiant heat being directed inwardly from wall 3 will heat evenly all of the particles as they are falling through the chamber. Consequently, each particle will be fused individually into a sphere by the time it reaches the bottom of the fusion zone 2.

In view of the fact that the particles are falling through a heated chamber, and are in the chamber for only a very short period of time, it is desirable to bring them up to as near fusion temperature as possible, in the preheat chamber. Care must be taken, however, to make sure that the particles have not reached a temperature at which their surfaces have begun to become tacky before they enter sleeve 22, otherwise, they will stick together and clog up the feeding device.

Another form, which the furnace of the present invention can take, is shown in FIGS. 5, 6 and 7. The construction differs from that previously described, primarily in the means for supplying the particles to the furnace chamber, and in the construction of the furnace chamber itself.

The furnace of FIG. 5, as was the one previously described, is supported above floor level on a steel framework 45, which also includes suitable reinforcing members for the refractory work that forms the furnace proper. The furnace includes a refractory cooling section 46, which consists of a cylindrical chamber that is a continuation of the heating section built above it. Immediately above the cooling section is a burner section 47, which includes a plurality of vertical rows of burners 48 that are directed radially toward the center of the furnace chamber. These burners 48 are shown as being of the type mentioned above, and each vertical row is connected to a vertical manifold 49 by a suitable pipe connection 50, each of which has a valve therein. The individual vertical manifolds are connected to a supply pipe 51 for a combustible mixture of gas and air that supplies the burners with fuel. The upper portion 52 of the furnace is built up of suitable insulating and refractory brick to the top of the furnace chamber. Radially inward of the burners is a circular checker-work 53. A muffle wall 54, which is similar to the muffle wall 3 of the previously described embodiment, is mounted on suitable bricks, which extend outwardly from the walls as shown at 55, which bricks also serve to close the lower portion of the space between the outer walls and the muffle. This muffle is shown herein as forming the furnace chamber and fusion zone 56, through which the clay particles are dropped. In this case, the muffle will be of a material that has a good heat transfer rate, and is formed with a zig-zag profile, as is best shown in FIG. 6 of the drawing. This particular configuration of the muffle provides a larger radiating surface to radiate heat into chamber 56, as well as permitting the muffle to be made thin, so that it can be heated to a higher temperature, and still have strength enough to be self-supporting.

The lower end of the cooling zone is provided with a metal extension 57, in which is placed a radiation shield. This shield consists of a burner 58 that is located centrally of the extension, and is provided with an annular slot 59, through which fuel can be discharged to burn in a circular sheet.

The top of the furnace, with the particle feeding mechanism carried thereby, is built as a unit. This top is shown generally at 61, and rests on the upper edge of the furnace structure, with a sealing means, such as a sand seal 62, provided between the two. The top is provided with a series of vertical passages 63 that are in communication with the space between the outer wall of the furnace and the muffle wall 54, through which the products of combustion from the burners are exhausted. These passages are connected with an annular passage 64, that is in turn connected with ducts 65 that extend to the preheat chamber in the manner similar to ducts 15 described in connection with the embodiment shown in FIG. 1.

The preheat chamber in this embodiment is also supported above the furnace chamber by a suitable framework. The lower end of the preheat chamber is shown at 66 in FIG. 5, and is provided with a cone 67 attached to its lower end, through which the particles falling from that chamber are collected and directed toward the feeding device between the preheat chamber and the furnace or fusion chamber.

The interior surface of top 61 is substantially conical in shape, as shown at 68, and terminates in an inlet opening 69 that is concentric with the furnace chamber. It is noted that a small space 71 is provided between the upper end of the muffle 54 and surface 68 of the top, through which a small amount of the products of combustion may escape at certain times, as pointed out below.

The feed mechanism for the particles is located in inlet 69. This mechanism includes a metallic liner 72 for the inlet which is provided with a water cooling passage 73, so that the metallic parts of this feed mechanism are kept within a safe temperature range. Located across the inlet opening, and attached to liner 72, is a guide and stopper or valve 74 that has a conical upper surface. This member is fastened to the liner by suitable narrow supports 75, which supports will not interfere with the flow of particles past them. The guide 74 is provided with a refractory insert or plug 76 to protect it somewhat from the heat of the furnace. Particles flowing from cone 67, at the lower end of the preheat chamber, fall into a collector sleeve 77 that is provided with a bottom in the shape of an inverted cone 78, as shown in the drawings. A plurality of openings 79 are formed in cone 78 adjacent to the inner wall of the sleeve. These openings are arranged in a ring, so that the particles passing through them will fall through the furnace chamber in an annular column. This sleeve is slightly smaller in diameter than the diameter of liner 72, and is provided with a flange 81 that rests on the top of the liner, when the bottom 78 is resting upon the guide 74. The sleeve is also provided with an upper flange 82 that is engaged by a lifting mechanism, in the manner described above, in connection with FIG. 1, to raise and lower the sleeve, and therefore, control the flow of particles into the furnace chamber. It is noted that this flange 82 forms part of a seal, that can be a sand seal 83, between this part and cone 67.

In the operation of the apparatus, the burners 48 are supplied with a combustible mixture of fuel and air which is ignited. This mixture will burn along the surface of the burner cups to heat them and the checkerwork 53 immediately in front. The checkerwork will act to increase the speed of the combustion, so that the capacity of the burners is thereby increased. The checkerwork also serves the purpose of smoothing out any unevenness in temperature of the muffle, that may be obtained by the spot heating effects that sometime occur when burners of the type disclosed are too close to the muffle wall for their firing rate. The hot products of combustion rise through the space between the furnace outer wall and the muffle wall to heat the latter for its entire length. These products are discharged through passages 63 and 65 into the preheat chamber, where they will heat by contact the particles being dropped therethrough. Since the upper end of the furnace is sealed, there can be no escape of products of combustion through the upper end thereof. No draft will occur in the chamber, so that it is not necessary to have a closed bottom, as was the case when the muffle was provided with a porous wall through which products of combustion flowed to the furnace chamber. A large amount of radiation can be lost, however, through the opening in the bottom of the furnace, if some means is not provided to off-set this loss. This is the purpose of the burner indicated at 58. This burner produces a sheet of flame across the bottom of the chamber that will reflect radiation back into the furnace, and thereby prevent a loss of any considerable amount of heat through the opening.

The particles that fall through the preheat chamber are directed into sleeve 77. When this sleeve is lifted, the particles run through openings 79 in a series of streams over the guide 74, to fall in an annular stream or column through the fusion zone formed by chamber 56. Normally, more particles are supplied to the sleeve than can be passed through openings 79, whereby the sleeve is kept full at all times. When the supply of particles falls off, the sleeve is lowered. Because of the individual streams from openings 79, the annular column of falling particles is sufficiently broken, so that radiation can penetrate into the center of the column to heat all of the particles uniformly, and thereby increase the efficiency of the fusion operation.

When sleeve 77 is in its lower position, as shown in FIG. 7 of the drawings, flange 81 rests against the top of liner 72 to close opening 69 completely. When the sleeve is raised, however, so that particles can flow through openings 79 into the fusion chamber, a small annular passage is opened between liner 72 and flange 81, through which gases from slot 71 can flow. This small amount of gas flowing at a low velocity through the annular opening between the liner and sleeve will serve to carry away any dust that may have been formed by attrition of the particles during their fall through the preheat chamber and the sleeve. Thus, those particles which flow into the fusion chamber are dust-free. This means that the heat that would ordinarily be absorbed by dust produced as the particles rub against each other can be used for fusing of the particles. In addition, there is no dust to float in the atmosphere of the chamber and stick to the muffle wall. Any suitable means placed below the furnace opening can be used to collect the fused particles, or they can be collected in the manner shown in FIG. 2.

It will be seen that, in this modification, the furnace is so constructed that a very large radiating surface of an even temperature throughout its area is provided. Furthermore, the flow of particles into this chamber is such that they are dropped vertically in a steady stream that can be penetrated by radiation, in order to heat the particles uniformly, thereby producing an efficient and commerically practical apparatus for fusing clay particles into hollow spheres.

Another form that the invention can take is shown in FIGS. 8 and 9. This form differs from those previously described in that the construction of the furnace is such that no muffle is required, and in a different arrangement of the particle feed device.

Referring to FIGS. 8 and 9, there is shown a vertically extending, cylindrical furnace 85, having an unobstructed chamber 86 that is considerably reduced in diameter at its top to form an entrance 87 that is substantially smaller in diameter than the body of the furnace chamber. The furnace structure has inserted in the lower portion of its wall a plurality of horizontal rows of burners 88. These burners are of the low pressure type, whose flames are "lazy." The burners may either be supplied with a combustible mixture of fuel and air, or be of the type which will mix separately supplied fuel and air. Burners of this type located in the rings of burners, so that they are diametrically opposite each other, serve to counteract any effect a single burner may have to move freely falling particles from the center of the furnace chamber. In fact, the inwardly moving gases from the "lazy" flames of each ring of burners act to help keep a stream of falling particles in the center of the furnace. The atmosphere in furnace chamber 86 is like that in the previously described forms, in that it is sufficiently quiet, so that the particles will not be blown out of their falling pattern. The bottom of the furnace can be provided with some type of radiation shield if desired.

The products of combustion from the burners rise in the furnace chamber, and pass out of the chamber through openings 89 into passages 91. Gases passing through these passages discharge through openings 92 into a preheat chamber 93, similar to chamber 14 in FIG. 1, for example, where they preheat particles on their way to furnace chamber 86.

In this form of the invention, the particles to be bloated are dropped into the furnace in the same annular pattern used in FIGS. 5–7, although the mechanical arrangement is slightly different. Referring to the drawing, there is shown a metal structure between preheat chamber 93 and furnace chamber 86, that includes an outer conical member 94, and an inner conical member 95. The lower ends of these members are jointed by a disc 96 (FIG. 9) that is pierced by a ring of openings 97, through which the particles flow. Thus the falling particles have an annular pattern, in a plurality of streams that are spaced from each other around a circle. The member 95 is hollow, and communicates at its upper end with a discharge pipe 98 that extends to the exterior of the structure.

Flow of the particles through openings 97 may be stopped by a slide valve 99 that slides horizontally in a track 101 provided in the metal structure below openings 97. This valve can be moved in any suitable manner, either automatically or manually, by a handle 102. This valve also acts as a radiation shield to protect the feed mechanism from the heat of the furnace when no particles are flowing. It is noted that the lower portion of the metal structure can be provided with a chamber 103, through which cooling water can be circulated.

In the operation of this form of the invention, particles to be heated are dropped through preheat chamber 93 counterflow to the exhausting products of combustion to be collected in the space between cones 94 and 95. When slide valve 99 is open, the particles will fall in a vertical annular stream through openings 97, into furnace chamber 86. As the particles move downwardly through chamber 86, they are heated to their fusion temperature, and bloat into small, hollow spheres. A small portion of the furnace gases will sweep across the falling stream of particles and be exhausted through the center of cone 95 and pipe 98. These gases will carry any dust that may be traveling with the particles out of the furnace. The type and arrangement of burners 88 is such, as explained above, that the falling pattern of the particles is not sufficiently disturbed to cause the particles to strike against the furnace wall. This is helped by the small area of the falling column of particles relative to the area of the furnace chamber. The heated zone of the furnace is sufficiently high above a collecting pan 104, or other suitable collecting device, for the fused particles to cool sufficiently, so that their surfaces are not tacky by the time they are collected.

Ordinarily, at the end of a run, preheat chamber 93 is allowed to empty before valve 99 is closed. This valve acts as a radiation shield to protect the feed mechanism from excessive heating. If the furnace is stopped operating for any length of time, while the burners are still firing, however, it is possible for enough heat to travel by conduction through the parts to heat the feed mechanism to a temperature where the particles could become tacky. If the preheat chamber is empty, this cannot happen.

It has been found that the particles, when falling in a columnar pattern through the center of the furnace, as shown in each of the embodiments, will fall straighter than if they are sifted or dropped singly. Apparently, the columnar pattern of falling particles pierces the atmosphere of the furnace in such a fashion that it pulls any stray particles toward the center of the furnace to assist in keeping individual particles away from the furnace wall. What ever the reason, a columnar pattern of particles dropped through the center of the furnace is effective in helping to keep the furnace walls clean.

From the above description, it will seem that I have provided an apparatus in which clay particles are first preheated, and then supplied in a vertically descending column through a chamber in which they are fused. These particles are then discharged from the chamber to a point of collection. The apparatus is so designed that the particles with fall freely, and will not engage the surface of the chamber wall. The flow of particles can be regulated, so that they fall vertically, and the falling column is loose enough, so that all of the particles can be heated to fusion temperature before reaching the bottom of the furnace chamber.

While in accordance with the provisions of the statutes, I have illustrated and described the best form of embodiment of my invention now known to me, it will be apparent to those skilled in the art that changes may be made in the form of the apparatus disclosed, without departing from the spirit and scope of the invention, as set forth in the appended claims, and that in some cases, certain features of my invention may be used to advantage without a corresponding use of other features.

What is claimed is:

1. Apparatus for heating discrete particles including structure forming a supply chamber and an elongated vertically and substantially cylindrically extending heating chamber having walls and being located below said supply chamber, means to control the flow of particles from said supply chamber to said heating chamber including a cylindrical member having a vertically extending passage therein aligned coaxially with and substantially smaller in diameter than said heating chamber, means cooperating with the passage in said member to close said passage, said passage and said means serving jointly to direct and maintain a vertically descending stream of particles smaller in diameter than said heating chamber into said chamber whereby particles in said stream will not engage the walls of said chamber, means to heat said heating chamber to the fusing temperature of said particles without substantially disturbing the pattern of said falling stream of particles, and means to collect the particles at the bottom of said heating chamber.

2. Apparatus for heating discrete particles which comprises structure forming a vertically extending, substantially cylindrical furnace chamber having a circular wall, means including a member provided with a ring of openings the exits of which are horizontally aligned to supply a vertically descending, annular stream of particles to the top of said chamber and maintain said stream in said chamber without substantial change of form, means to close said openings, said chamber being of such a diameter that the particles of the stream do not touch the furnace wall, additional structure forming a preheat chamber above said supply means and connected therewith whereby particles in said preheat chamber are delivered to said supply means, burner means in the wall of said heating chamber, and means including passages in said structure outside said means to supply to deliver products of combustion from said burner means to said preheat chamber.

3. Apparatus for heating discrete particles comprising structure forming a supply chamber having a discharge opening in the bottom thereof, flow control means in said opening operative to discharge vertically downward a plurality of parallel streams of particles, said streams being directed vertically downward in parallel relation without substantial change of form, additional structure forming a vertically extending heating chamber having vertical walls below said supply chamber and concentric with the discharge opening therein, said heating chamber being of a diameter large enough so that its walls will not be struck by particles falling vertically from said discharge opening, burners in the lower portion thereof to heat the wall of said heating chamber, and means including passages in said structure outside of and surrounding said flow control means to direct the products of combustion from said burners to said supply chamber.

4. Apparatus for heating discrete particles comprising structure forming a vertically extending furnace chamber having walls of a fixed diameter and a supply chamber located vertically above said furnace chamber, flow control means for particles passing from the supply to the furnace chamber comprising a vertically extending cylinder coaxial with said chambers, said cylinder being provided in its lower end with a ring of openings each terminating at the same horizontal level through which particles can flow in an annular stream of a diameter smaller than said furnace chamber, means to maintain said stream in said chamber without substantial change of form whereby falling particles will not touch the walls thereof, means to stop flow of particles through said cylinder, and burner means in said structure adjacent to the lower end of said furnace chamber to heat the same.

References Cited in the file of this patent

UNITED STATES PATENTS

| | | |
|---|---|---|
| 512,673 | Mason | Jan. 9, 1894 |
| 1,038,205 | Roitzheim | Sept. 10, 1912 |
| 1,089,110 | Chappell | Mar. 3, 1914 |
| 1,370,915 | Riveroll | Mar. 8, 1921 |
| 1,468,632 | Hall | Sept. 25, 1923 |
| 1,533,572 | Richards | Apr. 14, 1925 |
| 1,571,612 | Ward | Feb. 2, 1926 |
| 1,758,188 | Cordy | May 13, 1930 |
| 1,914,482 | Bunce et al. | June 20, 1933 |
| 1,992,669 | Labus | Feb. 26, 1935 |
| 2,020,504 | Hantla | Nov. 12, 1935 |
| 2,038,251 | Voigt | Apr. 21, 1936 |
| 2,044,680 | Gilbert | June 16, 1936 |
| 2,086,504 | Kirkpatrick | July 6, 1937 |
| 2,296,440 | Heller | Sept. 22, 1942 |
| 2,501,962 | Pierce | Mar. 28, 1950 |
| 2,658,744 | Ipsen | Nov. 10, 1953 |
| 2,835,483 | Lindsay | May 20, 1958 |

FOREIGN PATENTS

| | | |
|---|---|---|
| 495,001 | Germany | Apr. 1, 1930 |